E. BADLAM.
Rotary Cultivator.
No. 50,438. Patented Oct. 17, 1865.
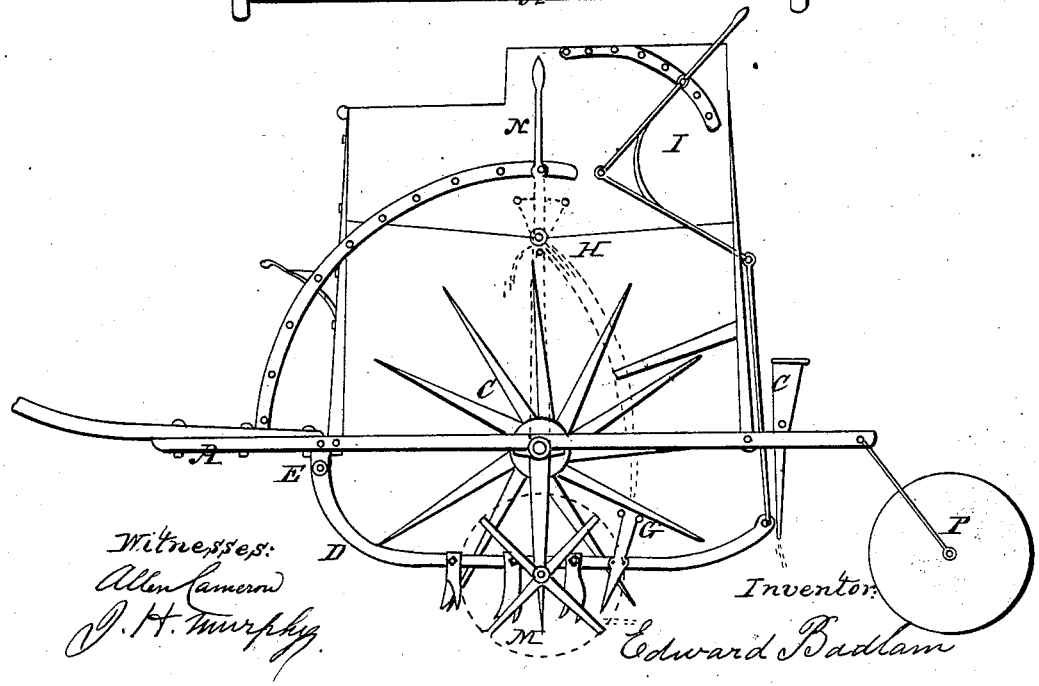

UNITED STATES PATENT OFFICE.

EDWARD BADLAM, OF OGDENSBURG, NEW YORK.

IMPROVEMENT IN GRAIN-DRILL AND CULTIVATOR COMBINED.

Specification forming part of Letters Patent No. 50,438, dated October 17, 1865.

*To all whom it may concern:*

Be it known that I, EDWARD BADLAM, of Ogdensburg, in the county of St. Lawrence and State of New York, have invented a new and useful Improvement called a "Cultivator, Seed-Sower, and Roller Combined," enabling the operator to thoroughly pulverize the soil, sow the grain broadcast or in drills, also sow the grass-seed and roll the land, all done in once passing over the ground; and I do hereby declare that the following is a full, clear, and exact description of the construction and operation of the same, reference being had to the annexed drawings, making a part of this specification, in which—

Figure 1 represents a plan view of my cultivator and seed-sower. Fig. 2 is a side view.

Similar letters of reference indicate corresponding parts in both figures.

To enable others skilled in the art to make and use my invention, I will proceed to describe its construction and operation.

I construct my cultivator and seed-sower by making a quadrangular frame, A, with the shaft B attached, and passing crosswise of frame A, and on shaft B are attached at equal distances cutter-wheels C C, which are attached to shaft B, and the cutters are formed with a winding shape, so as to retain a hold on the soil when the machine is in motion; also, to cut and pulverize the soil.

D is a frame attached to frame A by rod E passing crosswise of frame A, and attached at each end; and on rod E, at equal distances, are bars F F attached, passing between cutter-wheels C C from front to rear, and attached at the rear ends by a rod passing crosswise, and the ends of bars F F attached, making the frame D; and on each of bars F F are attached cultivator-teeth near the middle of bars F F, and when the machine is in motion the cutter-wheels C C, revolve in the opposite direction from the forward movement of the cultivator-teeth on bars F F, thus thoroughly cutting and pulverizing the soil; and on bars F F are attached drill-teeth toward the rear end, G G; and by the conducting-tubes H H extending from seed-box I to drill-teeth G, the operator can sow the seed in drills or broadcast, as desired, by turning the conductor J.

K is a rod attached to frame D at the rear end, and by a lever, L, the operator can raise and lower the frame D at pleasure.

M M are wheels attached to the ends of shaft B, and by means of the levers N N the operator can raise the frame A with the frame D when passing over the land.

O is the grass-seed box; and P is the roller attached at the rear end of frame A, thus enabling the operator to sow the seed broadcast or in drills, thoroughly cultivate and pulverize the soil, sow the grass-seed, when desired, and roll the land, all accomplished in once passing over the land.

What I claim as my improvement, and desire to secure by Letters Patent, is—

The combining and arranging of the cutter-wheels C C on shaft B with the cultivator-teeth as arranged on bars F F, with the drill-teeth G G, seed-boxes I and O, and roller P, and conducting-tubes H H, with the quadrangular frame A, and wheels M M, all combined and arranged in the manner and for the purpose herein set forth.

EDWARD BADLAM.

Witnesses:
J. V. WATERBURY,
ALLEN CAMERON.